Nov. 1, 1932.  E. L. CONNELLY  1,885,416
LATHERING DEVICE
Filed June 10, 1931
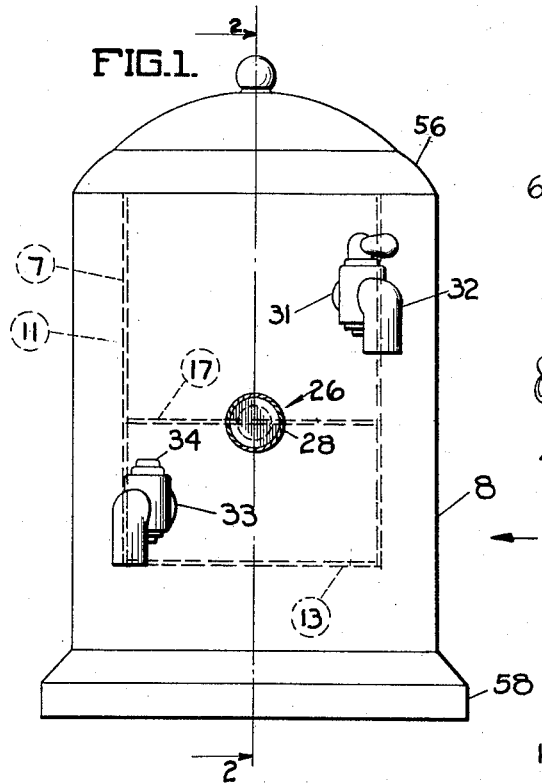
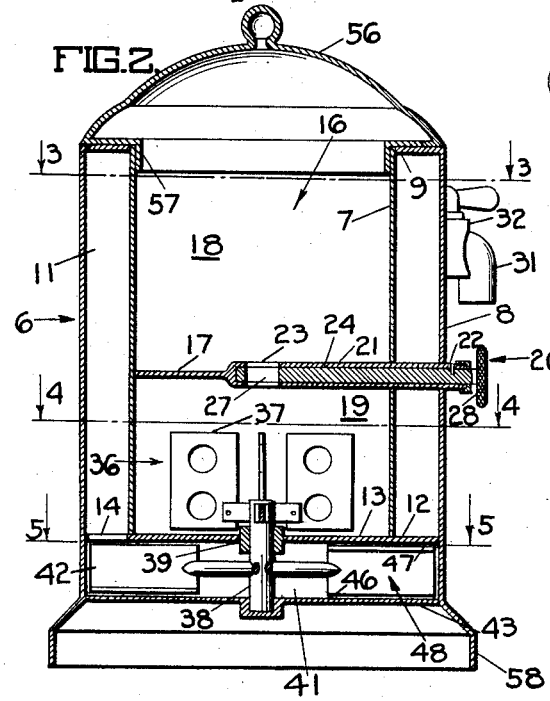
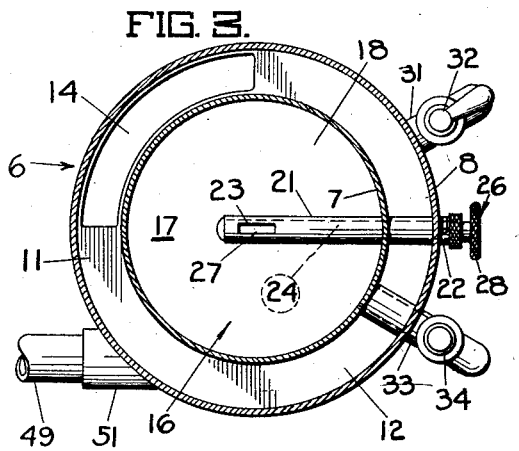
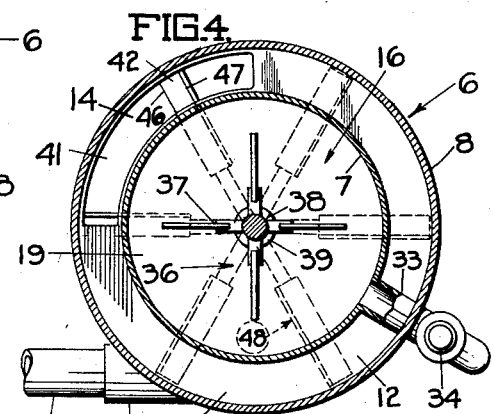
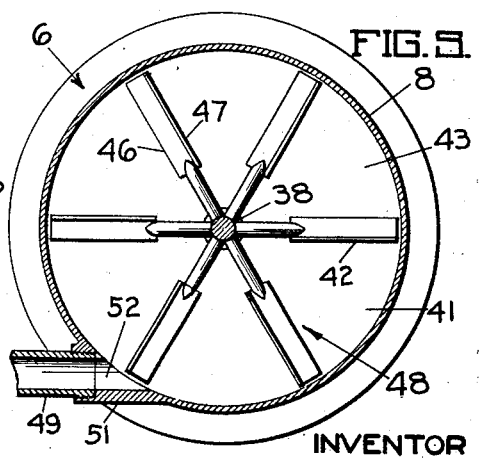
INVENTOR
E.L. CONNELLY
BY Hazard and Miller
ATTORNEY Patented Nov. 1, 1932

1,885,416

UNITED STATES PATENT OFFICE

EMMETT L. CONNELLY, OF LOS ANGELES, CALIFORNIA

LATHERING DEVICE

Application filed June 10, 1931. Serial No. 543,360.

My invention is a lather mixer, and has for an object the provision of a device provided with means for delivering hot water and lather in any desired quantities, it being intended that the device of the present invention shall be used in barber shops, and the like.

Another object is to provide a lather mixer having a beater mechanism adapted to thoroughly work the lather to proper consistency, this beater being operated by power derived from a rotor or turbine, which in turn is operated upon by the hot water entering the hot water reservoir of the device.

Another object is to provide means for controlling the amount of lather admitted to the lather reservoir.

The invention possesses other objects and advantageous features, some of which, with those enumerated, will be set forth in the following description of the invention's particular embodiment which is illustrated in the drawing accompanying and forming a part of the specification.

Referring to the drawing:

Fig. 1 is a front elevation of a device embodying the principles of the present invention.

Fig. 2 is a vertical medial sectional view taken upon the line 2—2 of Fig. 1, with the direction of view as indicated.

Fig. 3 is a horizontal sectional view taken upon the line 3—3 of Fig. 2, with the direction of view as indicated.

Fig. 4 is a horizontal sectional view taken upon the line 4—4 of Fig. 2, with the direction of view as indicated.

Fig. 5 is a horizontal sectional view taken upon the line 5—5 of Fig. 2, with the direction of view as indicated.

Specifically describing my improved lather mixer in what at present appears to be its preferred embodiment, I have provided a receptacle, indicated in its entirety at 6 and comprising inner and outer shells 7 and 8, respectively, joined by a partition 9 at their upper edges to hold the two shells spaced from each other, so as to provide an annular hot water reservoir 11 therebetween. A second partition 12 joins the two shells 7 and 8 adjacent their lower edges, this partition preferably being an extension of the bottom 13 of the inner shell 7. However, this partition 12 is provided with an opening 14 extending throughout substantially 90° of arc of the annular reservoir 11, as clearly shown upon Figs. 3 and 4.

The space 16 within the inner shell 7 is divided in two by a horizontal partition 17, thus presenting an upper chamber 18 for soap solution and a lower chamber or reservoir 19 for lather. A tubular valve seat 21 is formed in the partition 17, and extends through the annular reservoir 11, so that its outer end 22 is disposed exteriorly of the outer shell 8. Alined openings 23 in the tubular valve seat 21 establish communication between the chamber 18 and the reservoir 19, except when the stem 24 of a valve 26 which is rotatably disposed within the valve seat 21 is turned so as to remove a diametric opening 27 in the valve 26 from registry with the openings 23 of the seat 21. The valve 26 is provided with an operating handle 28 on that end of the valve 26 which extends beyond the outer end 22 of the seat 21, whereby flow of soap solution from the chamber 18 to the reservoir 19 may easily be controlled.

The hot water reservoir 11 is provided with an outlet 31 which leads through the outer shell 8 to be accessible exteriorly thereof, and is provided with a manually operable valve 32 whereby any desired quantity of hot water may be withdrawn from the reservoir 11. The lather reservoir 19 also is provided with an outlet 33 which extends across the associated side of the annular hot water reservoir 11 and through the outer shell 8, and this outlet 33 also is provided with a manually operable valve 34. Preferably, the outlet 33 associated with the lather reservoir 19 communicates with the interior of that reservoir at a point spaced above the bottom 13 thereof, the purpose being to insure that whenever the valve 34 is opened, only well mixed lather will flow through the outlet 33. If the outlet 33 were adjacent the bottom 13, it might result that liquid soap solution and/or water would flow through the outlet 33 when the valve 34 is opened, it being understood that if the mixture is not sufficiently agitated the soap solution and/or water will tend to collect at the bottom of the reservoir with the thoroughly mixed lather floating on the top thereof.

A beater 36 is provided within the lather reservoir 19, this beater 36 being in the form of a plurality of paddles 37 carried by and disposed radially about a vertical central shaft 38 which extends through a suitable bearing 39 in the bottom 13 of the reservoir 19 and into the space 41 therebelow. This space 41 serves as a rotor chamber, inasmuch as the shaft 38 is provided with a plurality of radiating vanes 42 therein, these vanes extending preferably to positions adjacent the periphery of the chamber 41 and having their upper and lower edges disposed closely adjacent the under surface of the bottom 13 and the upper surface of the bottom 43 of the rotor chamber 41. Preferably, each of the vanes 42 is inclined slightly with its lower edge 46 somewhat in advance of its upper edge 47, the purpose being to cause the water which is directed against the vanes 42 to be continually urged downwards, thus resisting the tendency for the water to rise into the hot water reservoir 11 through the opening 14.

The rotor 48 defined by the several vanes 42 is adapted to be driven by power derived from the hot water before it enters the reservoir 11. For this purpose, a conduit 49, whereby hot water may be conducted to the chamber 41, is attached to a boss 51 formed on the outer shell 8, this boss having a bore 52 which enters the rotor chamber 41 adjacent one end of the opening 14 in the partition 12, and pointed substantially tangentially against the vanes 42, but in a direction away from the opening 14. Hence, the water entering the chamber 41 must travel through at least 180° about the shaft 38 before it is permitted to rise through the opening 14 into the hot water reservoir 11.

A lid or cover 56 is provided, this lid having a flange 57 adapted to enter the upper end of the chamber 18, so as to hold the lid 56 in place. I also prefer to provide a base flange 58 extending downwards from the bottom 43 so as to support the entire device.

The chamber 18 should be provided with a suitable quantity of soap solution, so that by manipulation of the valve 26 any desired amount thereof will be conducted into the lather chamber 19. Whenever any hot water is drawn off from the reservoir 11 by operation of the valve 32, its place will be taken by a fresh supply of hot water entering the reservoir 11 through the opening 14, rotor chamber 41, and conduit 49, it being understood that the conduit 49 should be connected to any suitable supply of hot water under pressure and that the reservoir 11 and rotor chamber 41 have no outlet other than by way of the valved outlet 31. Hence, whenever the valve 32 is opened to withdraw a portion of the contents of the hot water reservoir 11, the rotor 48 will be turned, causing like rotation of the beater 36, the paddles 37 of which will engage the soap solution which previously has been admitted to the reservoir 19, thereby working the solution into a lather which subsequently will be available for use by operation of the valve 34.

It is to be understood that the details of the invention as herein disclosed, are subject to alteration within the spirit or scope of the appended claims.

I claim:

1. In a lather mixer, a receptacle comprising spaced inner and outer shells defining a hot water reservoir therebetween, a horizontal partition within said inner shell dividing the space therein into a soap chamber and a lather reservoir, means for conducting soap solution from said chamber to said lather reservoir, exteriorly operable means for controlling flow through said conducting means, a rotor chamber, a rotor journaled therein and having a shaft extending into said lather reservoir, a beater carried by said shaft within said lather reservoir, means for directing water against said rotor to turn said shaft, each shell being provided with a separate outlet accessible exteriorly of said shells.

2. In a lather mixer, a receptacle comprising spaced inner and outer shells defining a hot water reservoir therebetween, a horizontal partition within said inner shell dividing the space therein into a soap chamber and a lather reservoir, means for conducting soap solution from said chamber to said lather reservoir, exteriorly operable means for controlling flow through said conducting means, a rotor chamber having an outlet leading into said hot water reservoir, a rotor journaled therein and having a shaft extending into said lather reservoir, a beater carried by said shaft within said lather reservoir, means for directing hot water against said rotor to turn said shaft, each shell being provided with a separate outlet accessible exteriorly of said shells.

3. In a lather mixer, a receptacle comprising spaced inner and outer shells defining a hot water reservoir therebetween, a horizontal partition within said inner shell dividing the space therein into a soap chamber and a lather reservoir, means for conducting soap solution from said chamber to said lather reservoir, exteriorly operable means for controlling flow through said conducting means, a rotor chamber having an outlet leading into said hot water reservoir, a rotor journaled therein and having a shaft extending into said lather reservoir, a beater carried by said shaft within said lather reservoir, means for directing hot water against said rotor to turn said shaft, each shell being provided with a separate outlet accessible exteriorly of said shells, and a valve operable to control flow through the outlet associated with said hot water reservoir.

4. In a lather mixer, a receptacle comprising spaced inner and outer shells defining a hot water reservoir therebetween, a horizontal partition within said inner shell dividing the space therein into a soap chamber and a lather reservoir, means for conducting soap solution from said chamber to said lather reservoir, exteriorly operable means for controlling flow through said conducting means, a rotor chamber having an outlet leading into said hot water reservoir, a rotor journaled therein and having a shaft extending into said lather reservoir, a beater carried by said shaft within said lather reservoir, means for directing hot water against said rotor to turn said shaft, each shell being provided with a separate outlet accessible exteriorly of said shells, and a separate valve operable to control flow through said outlets.

5. In a lather mixer a receptacle comprising spaced inner and outer shells defining a hot water reservoir therebetween, a horizontal partition within said inner shell dividing the space therein into an upper soap chamber and a lower lather reservoir, a valve in said partition for conducting soap solution from the soap chamber to the lather reservoir, each reservoir being provided with a separate valve controlled outlet accessible exteriorly of said shells.

6. In a lather mixer a receptacle comprising spaced inner and outer shells defining a hot water reservoir therebetween, a horizontal partition within said inner shell dividing the space therein into an upper soap chamber and a lower lather reservoir, valve controlled means for conducting soap solution from the soap chamber to the lather reservoir, and a fluid operated beater within the lather reservoir, each shell being provided with a separate valve controlled outlet accessible exteriorly of said shells.

In testimony whereof I have signed my name to this specification.

EMMETT L. CONNELLY.